United States Patent [19]

McGarry

[11] Patent Number: 4,478,963

[45] Date of Patent: Oct. 23, 1984

[54] FILLER PARTICLES COATED WITH REACTIVE LIQUID POLYMERS IN A MATRIX RESIN

[75] Inventor: Frederick J. McGarry, Weston, Mass.

[73] Assignee: The B. F. Goodrich Company, Akron, Ohio

[21] Appl. No.: 499,618

[22] Filed: May 31, 1983

Related U.S. Application Data

[63] Continuation-in-part of Ser. No. 176,425, Aug. 8, 1980, abandoned.

[51] Int. Cl.³ .................................................. C08L 67/06
[52] U.S. Cl. ...................................... 523/205; 523/201; 523/206; 523/208; 523/500; 524/425; 524/601
[58] Field of Search ............... 523/205, 209, 201, 206, 523/215, 217; 524/601

[56] References Cited

U.S. PATENT DOCUMENTS

| | | | |
|---|---|---|---|
| 3,024,209 | 3/1962 | Ferrigno | 260/40 TN |
| 3,518,221 | 6/1970 | Kenyon et al. | 260/37 |
| 3,519,593 | 7/1970 | Bolger | 260/42.14 |
| 3,544,500 | 12/1970 | Osmond et al. | 260/42.14 |
| 3,956,230 | 5/1976 | Gaylord | 260/42.16 |
| 4,017,452 | 4/1977 | Schwarz | 260/42.14 |
| 4,071,494 | 1/1978 | Gaylord | 260/40 R |
| 4,210,571 | 7/1980 | Herman | 260/40 R |
| 4,221,697 | 9/1980 | Osborn | 260/42.14 |

Primary Examiner—Theodore E. Pertilla
Attorney, Agent, or Firm—George A. Kap; Alan A. Csontos

[57] ABSTRACT

A composite comprising filler particles having a thin film of a reactive liquid polymer embedded in a polymeric matrix made by the method which includes the steps of mixing said reactive liquid polymer and said filler in order to provide a thin film of said reactive liquid polymer on said filler particles, mixing said coated filler particles with a polymeric matrix, and forming said composite.

19 Claims, No Drawings

4,478,963

FILLER PARTICLES COATED WITH REACTIVE LIQUID POLYMERS IN A MATRIX RESIN

REFERENCE TO RELATED APPLICATION

This application is a continuation-in-part of application entitled "Filler Particles Coated With Reactive Liquid Polymers In A Matrix Resin" filed Aug. 8, 1980 and bearing Ser. No. 176,425, now abandoned.

BACKGROUND OF THE INVENTION

The use of unsaturated polyester resins in the molding of reinforced products enjoys broad application in the manufacture of automotive, industrial, and home products. With the advent of gasoline shortages, the automotive industry has increased its efforts to replace metal parts with fiber-reinforced composites to reduce weight and gasoline consumption. In this respect, it has been an important objective to improve physical properties of the polyester composites.

To improve crack resistance of fiber-reinforced composites, polyester resins of the type used in SMC have been modified by addition of reactive liquid polymers, such as vinyl terminated butadiene-acrylonitrile. The fracture surface energy of the modified polyester resin was thus improved by better than 9 times at a loading of 10 parts of the liquid polymer per 100 parts of about 40/60 alkyd/styrene resin and better than 3 times for a 42/58 alkyd/styrene resin. Although the toughening effect of the liquid polymers was very attractive, the resulting modified polyester resins presented mixing problems due to the incompatiblity of the liquid polymers with the polyester resins.

Numerous attempts have been made to improve mechanical properties of filled polyester composites by admixing fillers, polyester resins, reactive liquid polymers, and other additives with the polyester resins, however, such attempts have been only marginally successful or totally unsuccessful due to inherent brittleness and incompatibility of the materials, or other problems.

U.S. Pat. No. 3,518,221 to Kenyon, et al., discloses a molding composition and a process for preparing same by coating reinforcing particles with a first thermosettable resin, and then embedding the coated particles in a second thermosettable matrix resin, the second matrix resin being more rigid than the first resin. The first and second resins can be same or different as long as the second resin is more rigid than the first resin. The resins can be selected from epoxy, polyester, phenolic, amide, imide, amine, or urethane resins. In a preferred embodiment, the resins are selected from epoxide resins such as the Epons and Araldites. A particularly suitable commercially available resin is Epon-815 having average molecular weight of about 330. Such compositions can be molded to form shaped articles having very good tensile strength and modulus.

U.S. Pat. No. 3,956,230 to Gaylord discloses preparation of a composition by coating hydroxyl-containing filler particles with a first thermoplastic polymer containing labile atoms in the presence of an ethylenically unsaturated carboxylic acid or anhydride coupling agent under conditions which will generate free radicals on the thermoplastic polymer. Free radicals are formed by using a catalyst, such as a peroxide. The acid is thereby coupled onto the thermoplastic polymer and is reacted with the hydroxyl groups on the filler particles by means of esterification and hydrogen bonding. The coated filler particles are then dispersed in a thermoplastic polymer matrix, which can be same or different as the first thermoplastic coating resin. Suitable thermoplastic resins, which are disclosed at bottom of col. 2 and in col. 3 of the Gaylord patent, include polyurethanes which may be obtained by reaction of a diisocyanate with a polyol such as polyethylene oxide, polypropylene oxide, polytetramethylene glycol, hydroxyl-terminated polyesters, hydroxyl-terminated polyisobutylene and hydroxyl-terminated polybutadiene.

As the Kenyon, et al. and Gaylord patents will verify, which patents are discussed above, the prior art is replete with disclosures of epoxy resins used as a coating on particulate filler particles which are thereafter mixed with a matrix resin to form molding and other compositions. Epoxy resins of lowest molecular weight, such as Epon® 815 and 828, are based on diglycidyl ether and bisphenol A and have number average molecular weight (Mn) of about 380 to 400 and heat distortion temperature (HDT) of about 65° to 75° C., see p. 66 of the text entitled "Epoxy Resins" by Lee and Neville, published by McGraw-Hill Book (1957). Higher molecular weight resins have higher HDTs. HDT depends to a degree on the curing agent used. For instance, diethylene tetramine curing agent will yield epoxy resins having low HDT whereas aromatic amines as curing agent will give epoxy resins having high HDT of about 150° C. Generally, HDT and Tg of a material will be within 10° C. of each other, with HDT being lower than Tg. Comparison of the hereinclaimed functionally terminated reactive liquid polymers with the lowest molecular weight epoxy reins shows that Tgs of the epoxy resins are at least 50° C. higher than Tgs of the reactive liquid polymers. Of course, for higher molecular weight epoxy reins, the difference will be greater.

SUMMARY OF THE INVENTION

This invention relates to products comprising polymer coated filler particles embedded in a matrix resin and to a method for preparing such products by initially coating the filler particles with a reactive liquid polymer and then mixing the coated filler particles with a matrix resin before forming the mixture into the desired shape.

DETAILED DESCRIPTION OF THE INVENTION

The products of this invention comprise polymer coated filler particles embedded in a thermoplastic or thermosetting matrix resin. The filler particles are coated with a thin film of a reactive liquid polymer, mixed with a matrix resin and allowed to harden. Liquid polymers suitable for this purpose include hydroxyl, vinyl, amine, carboxyl, mercaptan, isocyanate, and epoxy terminated reactive liquid polymers. To enhance adhesion or chemical bonding, various coupling agents can be applied to the filler particles separately or in the form of a blend of the coupling agent and a reactive liquid polymer, depending on the selective reactivity of functional groups of the cure agent and reactive liquid polymers, before mixing with a resin.

The reactive liquid polymer is used in a proportion calculated to deposit a thin film on the filler particles on the order of 500 to 2000 angstroms in thickness. Amount of the liquid polymer can vary from 0.1 to 50 parts, preferably 2.5 to 20 parts, whereas amount of a coupling agent can vary from 0.01 to 10 parts, preferably 0.1 to 5 parts, amounts of both ingredients are based on 100 parts by weight of filler. As to the composite product itself, amount of coated filler per 100 parts of the matrix resin can vary up to 500 parts, preferably from 20 to 200 parts.

Reference herein will be made to overcoated and additive methods of preparing composite products. The overcoating method involves the coating of filler particles with a film or a coating of a liquid polymer and then admixing the coated filler particles with a matrix resin. In the additive method, the filler particles, liquid polymer and the matrix resin are all mixed together and then formed into a rigid structure.

As regards the filler materials suitable for use in the compositions of this invention, these may include conventional inorganic fillers such as carbonates, clays, sulfates, phosphates, silica, silicate, micromica, carborundum, asbestos, glass, sandstone, graphite, and the like, reduced to a fine powder, as well as organic materials such as polyolefins, polyvinyl chloride, carbon black and acetylene black, polyacrylate, polymethacrylates, solid polyesters, phenol-formaldehyde resins, urea-formaldehyde resins, polyformal resins, polyamid resins, used in a form ranging from very fine powder to granular size, and fibers. Included herein are glass fibers and the high-strength fibers of up to about 0.5 inch in length, preferably 0.03 inch to 0.3 inch in length.

Organic or inorganic bubbles may be used as fillers to reduce the weight of the compositions of this invention. Hollow glass bubbles are particularly desirable as a weight reducing filler. The glass bubbles have a nominal density less than 0.7 and preferably less than 0.5 grams per cubic centimeter. They are of small particle size of about 1 to about 500 microns, and preferably less than 150 microns.

Preferred fillers for purposes herein are the inorganic fillers, such as Atomite calcium carbonate. This particular filler has a mean particle diameter of 2.5 microns, low absorption, low binder demand due to a graded particle distribution, and good wetting characteristics. Its particle size range is up to 10 microns.

As already mentioned, a large number of reactive liquid polymers are suitable as coating materials for the fillers, including hydroxyl, vinyl, amine, carboxyl, mercaptan, isocyanate, and epoxy terminated liquid polymers. These polymers have number average molecular weights in the range of about 1,000 to 20,000, preferably 2,000 to 5,000, as measured with a Mechrolab Pressure Osmometer. In terms of bulk viscosity, these polymers are in the range of about 500 to 8,000,000 cps, measured at 27° C. with a Brookfield model LVT viscometer using spindle #7 at 0.5 to 100 rpm. In a preferred embodiment, these reactive liquid polymers have a bulk viscosity in the range of about 5,000 to 2,000,000 cps at 27° C. and most preferred are liquid polymers with a bulk viscosity in the range of 10,000 to 400,000 cps at 27° C. The functional groups, which can be hydroxyl, vinyl, amine, carboxyl, mercaptan, isocyanate, and epoxy, comprise about 0.5 to 10%, preferably 1 to 5%, by weight based on the weight of the polymer. Glass transition temperature (Tg) of the functionally terminated reactive liquid polymers of this invention is in the range of about 20° to −100° C., preferably −20° to −80° C.

The functionally terminated polymers have polymeric backbones comprising carbon-carbon linkages, carbon-oxygen linkages, polyether linkages, or polysulfide linkages, of which the carbon-carbon linkages are preferred. Generally, the carbon-carbon linkages comprise at least about 95% by weight of total polymeric backbone weight.

The polymers having carbon-carbon linkages contain polymerized units of vinylidene monomers selected from (a) monoolefins containing 2 to 8 carbon atoms such as ethylene, propylene, isobutylene, 1-butene, 1-pentene, 1-hexane, and the like; (b) dienes containing 4 to about 10 carbon atoms, such as butadiene, isoprene, 2-isopropyl-1,3-butadiene, chloroprene, and the like; (c) vinyl aromatics containing 8 to 12 carbon atoms such as styrene, α-methyl styrene, vinyl toluene, and the like; (d) vinyl nitriles containing 3 to 6 carbon atoms such as acrylonitrile, methacrylonitrile, and the like; (e) vinyl and allyl esters containing 4 to 8 carbon atoms such as vinyl acetate, vinyl proprionate, allyl acetate, and the like; (f) vinyl and allyl ethers containing 3 to 8 carbon atoms such as vinyl methyl ether, allyl methyl ether, and the like; (g) aromatic divinyls containing 8 to 12 carbon atoms, aliphatic divinyls containing 4 to 8 carbon atoms, and diacrylates containing 8 to 12 carbon atoms, such as divinyl benzene, divinyl ethers, diethylene glycol diacrylate, and the like; and (h) acrylic acids containing 3 to 6 carbon atoms and esters thereof containing a total of 4 to 23 carbon atoms, of the formula

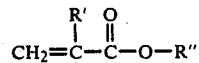

wherein R' is hydrogen, or a lower alkyl such as methyl or ethyl groups; and R" is hydrogen, an alkyl radical containing 1 to 18 carbon atoms or an alkoxyalkyl, alkylthioalkyl, or cyanoalkyl radical containing 2 to about 12 carbon atoms. Examples of such acrylates are ethyl acrylate, butyl acrylate, hexyl acrylate, 2-ethylhexyl acrylate, dodecyl acrylate, octadecyl acrylate, methoxyethyl acrylate, butoxyethyl acrylate, hexylthioethyl acrylate, β-cyanoethyl acrylate, cyanooctyl acrylate, methyl methacrylate, octyl methacryate, ethyl ethacrylate, and the like. Often two or more types of polymerized monomeric units are contained in the polymeric backbone.

Examples of liquid carboxyl-terminated polymers are carboxyl-terminated polyethylene, polybutadiene, polyisoprene, poly(butadiene-acrylonitrile), poly(butadiene-styrene), poly(butadiene-acrylonitrile-acrylic acid), poly(ethyl acrylate), poly(ethyl acrylate-n-butyl acrylate), poly(n-butyl acrylate-acrylonitrile), poly(butyl acrylate-styrene), and the like. The polymers can be prepared by free radical polymerization using carboxyl-containing initiators and/or modifiers as disclosed in U.S. Pat. No. 3,285,949 and German patent No. 1,150,205, and polymers prepared by solution polymerization using lithium metal or organometallic compounds and post-treating the polymers to form carboxyl groups as disclosed in U.S. Pat. Nos. 3,135,716 and 3,431,235. The German patent teaches the use of dithio materials as chain transfer agents in the preparation of carboxyl-terminated reactive liquid polymers, however, the dithio materials are very inefficient chain tranfer agents and this preparation route is not recommended. U.S. Pat. No. 3,285,949 discloses preparation of carboxyl-terminated reactive liquid polymers using a bis-azocyano acid initiator, such as azodicyano-valeric acid, to provide the carboxyl groups at terminal positions and to control molecular weight. Liquid carboxyl-terminated polymers such as carboxyl-terminated polybutadiene, polybutadiene-acrylonitrile, and polyacrylate were found to be excellent reactants for the preparation of the novel reactive liquid polymers.

Examples of liquid mercaptan-terminated polymers are mercaptan-terminated polybutadiene, polyisoprene, poly(butadiene-acrylonitrile), poly(ethyl acrylate), poly(ethyl acrylate-n-butyl acrylate), poly(ethyl acrylate-n-butyl acrylate-glycidyl acrylate), and the like. The polymers can be prepared by free-radical polymerization of monomers in the presence of dixanthogen disulfide and then post-reacted to form the mercaptan groups, as disclosed in U.S. Pat. Nos. 3,449,301 and 3,580,830 and British patent No. 859,470. Also included herein are mercaptan-terminated polyethers as disclosed in Journal of Polymer Science, Vol. 12 (1968), page 107; and mercaptan-terminated polyalkylene sulfides.

Examples of liquid hydroxyl-terminated polymers which can contain sulfide linkages near the terminal portions of the polymeric molecule are hydroxyl-terminated polyethylene, polybutadiene, polyisoprene, poly(butadiene-acrylonitrile), poly(acrylates), and the like. The polymers can be prepared by post-reacting carboxyl-terminated polymers, as disclosed in U.S. Pat. No. 3,551,471 and 3,551,472; by free-radical polymerization of monomers using hydroxyl-containing initiators, as disclosed in U.S. Pat. No. 2,844,632; and by solution polymerization using lithium or organometallic catalysts and post-reacting the product to form the hydroxyl groups, as disclosed in U.S. Pat. Nos. 3,135,716 and 3,431,235. Preferably, these liquid polymers are prepared by reacting a carboxyl-terminated reactive liquid polymer with a glycol or an alkylene oxide, preferably ethylene oxide, to position hydroxyl groups at ends of polyer chains. The hydroxyl terminated polyepihalohydrins can be prepared pursuant to the disclosure of the Dreyfuss U.S. Pat. No. 3,850,856 by cationic polymerizing of an epihalohydrin in presence of water or a glycol, such as ethylene glycol, employing as an initiator a trialkyl oxonium salt of an $HMF_6$ acid where M is phosphorus, arsenic, or antimony.

Examples of liquid amine-terminated polymers are the amine-terminated poly(2-methyl ethoxy) polymers and the glycol polyamines disclosed in U.S. Pat. No. 3,306,809. U.S. Pat. No. 4,133,957 describes preparation of amine-terminated liquid polymers by reacting carboxyl-terminated, ester-terminated or acid chloride-terminated liquid polymers having a carbon-carbon backbone with an aliphatic, alicyclic, heterocyclic, or aromatic amine. Preferably, these polymers are prepared by reacting a carboxyl-terminated reactive liquid polymer with an aminoalkyl piperazine, such as aminoethyl piperazine.

Examples of liquid epoxy-terminated polymers are glycidyl ethers of polyhydric alcohols such as glycerol, pentaerithritol, polyvinyl alcohol, 1,3,5-trihydroxybenzene, and the like; the glycidyl ethers of polyhydric phenols, such as bisphenol A resins, and of phenol-formaldehyde products, such as the Novolac resins; and other epoxies as disclosed in U.S. Pat. No. 3,310,601. These polymers can be prepared by reacting a carboxyl-terminated reactive liquid polymer with an epoxy compound or resin to provide terminal epoxy functionality.

Liquid vinylidene terminated polymers can be prepared by reacting a liquid polymer having a terminal functional group selected from carboxyl, hydroxyl, mercaptan, amine, and epoxy with a compound containing both an epoxy group and a vinylidene group. This reaction can be catalyzed with a base. U.S. Pat. No. 4,129,713 describes certain of the liquid vinylidene-terminated polymers and preparation thereof. Preferably, these polymers are prepared by reacting a carboxyl-terminated reactive liquid polymer with an unsaturated glycidyl ester, such as glycidyl acrylate.

The isocyanate terminated liquid polymers can be prepared by reacting a diisocyanate, a dihydroxy terminated polyoxypropylene, and a polypropylene ether triol in presence of a miscible and compatible plasticizer. These liquid polymers have viscosity of 25,000 to 100,000 cps at 27° C. and molecular weight of 15,000 to 25,000. Another manner of preparing such liquid polymers comprises the reaction of an organic polyisocyanate with a diamine and an active hydrogen-containing material selected from polyester polyols and low molecular weight monomeric diols. U.S. Pat. Nos. 3,912,790 and 3,933,725 disclose suitable isocyanate terminated reactive liquid polymers and their preparation.

In order to increase the bonding between a filler particle and the film of a reactive liquid polymer thereon, a coupling agent can be utilized to this advantage. A coupling agent is a chemical additive which provides a molecular bridge between the interface of a filler particle and the reactive liquid polymer film thereon. Suitable coupling agents include titanates and silanes. A coupling agent is applied onto the surface of filler particles by mixing it with a reactive liquid polymer and then mixing the resulting material with the particulate filler in an amount calculated to provide a coating of desired thickness. Alternately, a coupling agent can be applied onto the filler particles followed by mixing with a reactive liquid polymer.

Silane coupling agents can be represented by the general formula $(RO)_3Si\ RX$ where X is a functional group such as amine, mercaptan, epoxy, haloalkyl, vinyl, acrylate or methacrylate, etc. These groups are attached to the silicon atom through a stable linkage R, usually a —$(CH_2)_3$— group. At the other end are hydrolyzable alkoxy or acetoxy groups, which hydrolyze to reactive —$Si(OH)_3$ functionality. Specific examples of silane coupling agents include p-tolyltrichlorosilane, p-bromomethylphenyltrichlorosilane, methacrylate ester silane, a cationic vinylbenzyl-functional silane, triacetoxyvinylsilane, triacetoxychlorodimethylsilane, and the like.

A variety of titanate coupling agents are also available, including monoalkoxy, coordinate, and chelate. In general, monoalkoxy types are recommended for thermoplastics and organic-based polymers and wet fillers; and coordinates, for emulsification and transesterification inhibition with the hydroxyl groups or ester backbone of polymer systems such as epoxies, urethanes, polyesters and alkyds. Specific examples are isopropyl, triisostearoyl titanate for polyolefins and polyesters; isopropyl, tri(dioctylphosphate)titanate for epoxies and sulfur cured systems; as well as isopropyl, tri(dioctylpyrophosphate)titanate; tetraoctyloxytitanium di(-dilaurylphosphite); titanium diisostearate, oxyacetate; titanium di(dumylphenolate)oxyacetate; diacryl, ethylene titanate; isopropyl, tri(N-ethylaminoethylaminotitanate); and diisostearoyl, ethylene titanate.

The use of a coupling agent should be scrutinized since improved results are not necessarily obtained therewith. Certain composites prepared with overcoated filler particles containing a coupling agent between the filler particles and the liquid rubber coating gave lower fracture surface work values than same composites without a coupling agent on the filler particles. On the basis of experimental studies, it can be concluded that at low concentrations of certain low molecular weight reactive liquid polymers as coatings, addition of a coupling agent increases the value of fracture surface work although it does not appear to have any significant effect if a high molecular weight liquid polymer is used in low concentration.

The matrix resin can be thermosetting or thermoplastic. Phenolic resins such as phenol formaldehyde and urea formaldehyde, unsaturated polyesters, epoxies, and furans are examples of thermosetting materials in which, on curing, a heat-stable crosslinked polymer network extends throughout the finished article which permanently loses the ability to flow on heating.

A large number of thermoplastic matrix resins can be used in the manner described herein. These include polystyrene; copolymers of styrene and butadiene; copolymers of styrene and linear alkyd resins; polymers of styrene derivatives such as alkyl and alkoxy styrenes; polyester resins; acrylic resins such as polymethyl methacrylate, polymers of acrylic esters such as polymethyl acrylate, and other acrylic polymers such as polyacrylonitrile, polyacrylic and polymethacrylic acids; polyvinyl acetate and derived polymers such as polyvinyl alcohol and polyvinyl acetals; polymers and copolymers of vinyl chloride such as polyvinyl chloride, copolymers of vinyl chloride and vinyl acetate, copolymers of vinyl chloride and vinylidene chloride, and vinylidene chloride polymers and copolymers; polycarbonates; fluorine-containing polymers such as polytetrafluoroethylene, polyvinyl fluoride, and polyvinylidene fluoride; ethylene polymers and copolymers such as the various polyethylenes, and copolymers of ethylene with vinyl or vinylidene chloride, methyl methacrylate, acrylonitrile, tetrafluoroethylene, vinyl acetate, and alpha olefins such as propylene or butene-1; nylon resins; polyethylene terephthalate; and linear alkyd polyesters.

Preferred matrix resins useful in this invention are well known in the art and include those unsaturated polyester resins derived by condensation of unsaturated dibasic acids or anhydrides containing 4 to 9 carbon atoms with polyols including dihydroxy and trihydroxy compounds containing 2 to 12 carbon atoms. The polyesters may include in the polymeric chain varying proportions of other saturated or aromatic dibasic acids and anhydrides which are not subject to cross-linking. The particular noncross-linking moieties and their proportions will depend upon the desired properties of the final product. Maleic, chloromaleic and fumaric acid may be mentioned as exemplary of unsaturated dibasic acids. Aromatic and saturated acids and anhydrides which are exemplary of noncross-linking moieties with the copolymer include: phthalic anhydride, tetrachlorophthalic acid, adipic acid, sebacic acid, succinic acid, and the like.

Any of a variety of well known polyols including di- and tri-hydroxy compounds containing 4 to 9 carbon atoms, preferably 4 to 6 carbon atoms, can be used for condensation with the diacids to produce polyesters suitable for use in this invention. Preferred compounds, which are mentioned by way of example, of the large number of applicable compounds include: ethylene glycol, diethylene glycol, propylene glycol, polypropylene glycol, glycerol, 1,2-, 1,3- and 1,4-butadienols, trimethylol propane, and the like. The method by which the unsaturated polyester resins are made is well known and is not critical to this invention.

As used in this invention, the polyester resin is dissolved in a solvent comprising at least one polymerizable monomer which is copolymerizable with the dissolved polyester. The polymerizable monomer not only acts as a solvent but also copolymerizes with the unsaturated groups along the polyester chain. Polymerizable monomers which can be used in this invention include polymerizable vinylidene compounds having at least one terminal $CH_2=C<$ group and containing 2 to 12 carbon atoms, preferably 3 to 10 carbon atoms. A wide variety of these compounds are known including both aliphatic and aromatic unsaturated hydrocarbons and hydrocarbon derivatives, such as esters, acids and nitriles. Examples of suitable polymerizable monomers are styrene, methyl styrene, acrylonitrile, methyl acrylate, methyl methacrylate, vinyl acetate, allyl esters of phthalic, adipic, maleic, malonic, and cyanuric acids. Styrene and methyl styrene are particularly useful polymerizable monomers. Commercial unsaturated polyester resins are normally sold as a liquid solution with the unsaturated polyester resin dissolved in the polymerizable monomer.

Pursuant to this inventon, preparation of a composite involves coating of the filler particles with a coupling agent and/or reactive liquid polymer, mixing the pretreated filler particles with a matrix resin, and finally, forming the mixture into a structured composite. Other desired additives and reinforcing materials can be incorporated into the composite by premixing them with the pretreated filler and the liquid resin matrix. In instances where the use of a coupling agent is desired, the coupling agent can be applied individually or as a blend thereof with a reactive liquid polymer onto the filler particles, as already described.

EXAMPLES

The filler used herein was Atomite calcium carbonate with a mean particle size of 2.5 microns and particle size range of up to 10 microns. Its composition was about 98% calcium carbonate. Mixing was done in a Henschel high intensity laboratory mixer by initially adding thereto 2.204 pounds of the filler, Vanax CPA and methyl nicklate. Vanax CPA is dimethyl ammonium hydrogen isophthalic accelerator for cross-linking the hydroxyl terminated polyepichlorohydrin reactive liquid polymer and methyl nicklate is nickel dimethyl dithiocarbamate, an antioxidant for the liquid polymer. Thiate-E, which is trimethylthiourea, can be used alone or in conjunction with Vanax CPA as accelerator for the hydroxyl terminated polyepichlorohydrin reactive liquid polymer overcoat. Shortly after adding filler, accelerator and antioxidant to the mixer, a slightly warm solution of a coupling agent and reactive liquid polymer was added through a side port with mixing in progress. In some instances, the coupling agent was omitted. Mixing was thereafter continued for about 5 minutes following which, pretreated filler was removed from the mixer and the liquid film or coating thereon was allowed to cure by cross-linking. Amount of the reactive liquid polymer added was calculated to provide a film of 1000 or 2500 angstroms on the surface of filler particles. The coupling agent used in pretreating the filler was KR-44 titanate coupling agent, i.e., isopropyl, tri(N-ethylamino-ethylaminotitanate, which has very active primary amine groups.

Three different reactive liquid polymers were tested: HTEX1, HTEX2 and VTBNX, i.e., two varieties of hydroxyl terminated epichlorohydrin reactive liquid polymers and one vinyl-terminated butadiene acrylonitrile reactive liquid polymer. Properties of these liquid polymers are summarized in Table I below:

TABLE I

|  | HTEX1 | HTEX2 | VTBNX |
|---|---|---|---|
| Specific Gravity at 77° F. | 1.347 | 1.347 | 0.973 |
| Viscosity at 27° C., cps | 250,000 | 300,000 | 280,000 |
| Molecular Weight, Mn | 1,500 | 3,000 | 1,200 |
| Molecular Weight, Mw | 6,000 | 20,000 | — |
| Hydroxyl Content, % | 31.6 | 18.0 | — |
| Acrylic-Vinyl Content, % | — | — | 3.8 |
| Tg, °C. (by DSC) | −26.5 | −22.0 | −49 |

Mixing of pretreated filler with a matrix resin was carried out in a 600-ml flask with the aid of Air Drive Series 20 Lightning stirrer/mixer. In all of the samples, methyl ethyl ketone peroxide at 1 phr, as a low temperature cross-linking agent for an unsaturated polyester system containing styrene monomer, and cobalt naphthanate at 0.25 phr, as an accelerator for low temperature cross-linking of unsaturated polyester system containing styrene, were added to the resin in the flask at the start of the mixing. Amounts of the additives are based on the weight of the matrix resin. Methyl ethyl ketone peroxide was used as a 60% solution in dimethyl phthalate and cobalt naphthanate was used as a 6% solution in styrene monomer. Mixing was continued until a uniform dispersion of the additives was obtained in the matrix resin, at which time, pretreated filler was added and mixed with the resin. The polyester resin used was Selectron 50271, a high exotherm isophthalic unsaturated resin containing 30 to 35% styrene monomer. This resin is specifically designed for fast curing and high strength SMC. Its properties are given in Table II, below:

TABLE II

| Specific Gravity | 1.11-1.13 |
|---|---|
| Viscosity, cps | 1,600-1,900 |
| Acid Value | 22-32 |
| Water Content, % | 0.15 max. |

When Thiate-E accelerator for cross-linking was employed, it was hand mixed with the pretreated filler prior to addition of the matrix resin. Structural formula of Thiate-E is as follows:

$$\begin{array}{c} NH-CS-NCH_3 \\ | \quad\quad\quad | \\ CH_3 \quad\quad CH_3 \end{array}$$

Samples were cast in aluminum molds kept at 35° C. with curing proceeding at 35° C. The temperature was raised to 60° C. for 1 hour and then to 120° C. for post-curing for 2 hours. After curing, the samples were cut into two specimens approximately ¼" thick by 1¼" width by 9-13/16" long. Both edges of the specimen were milled to attain a width of exactly 1.2". Two 1/8" diameter holes were drilled at one end of the specimen, each 0.13" from the edge and 0.14" from the end. Both sides of the specimen were then slotted in the center along the entire length. The slot depth was approximately 1/12" and the width was 0.006". After slotting, a one-inch long notch was machined into the end of the specimen containing the two ⅛" drill holes.

Testing of the specimens was carried out in an Instron machine, to which the sample was attached by inserting pins through the ⅛" drilled holes. The free end was supported to keep the specimen in a horizontal position. Also, special care was taken so the sample would not be subjected to any bending arising from defective alignment of the pins.

A crosshead speed of 0.005 inches/minute and a chart speed of 2 inches/minute were used, with the chart calibrated at one-inch equal to one pound of force. Generally, the crack proceeded along a plane in the center of the specimen, although in some cases it deviated slightly and then returned to the plane. Also, the crack propagated in a discontinuous stick-slip mode; sudden jumps of the crack were followed by pauses as the load on the specimen gradually built up again.

The crack length was measured in each test, after it had propagated a few inches. Then the sample was retested, letting the crack propagate further. The measurement of the crack length was made by backlighting the specimen and using a scale; subsequently the specimens were cut to determine the accuracy of the crack length measured. In most cases they differed by an average of 5%, which was acceptable. The time versus force graph obtained for each specimen was used to determine work in inch-pounds.

The fracture surface energy for each specimen was then calculated as follows:

$$\frac{\text{work of fracture}}{2\,wl} \qquad (2)$$

where
   $w$ = crack width
   $l$ = crack length.

Fracture surface work values for the specimens whose sample composition is given in Tables III to V, were obtained from the Double Cantilever Beam Test. Two tests were carried out on each specimen, allowing the crack to propagate each time to a certain recorded length. Two fracture surface work values $\alpha_1$ and $\alpha_2$ were calculated and then an average value was determined using the following expression:

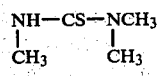

$$\alpha_{av.} = \frac{W_t}{2\,l_t w} \qquad (3)$$

where $W_t$ is the total work involved in propagating the crack over the total length $l_t$. The average value of fracture surface energy, or fracture toughness is used herein which is an indication of resistance to initiation and propagation of a crack.

Composition of the test samples is given in Table III, below, as well as comparison data for fracture toughness. To facilitate understanding of the test results, each sample is graphically illustrated by symbols wherein:

- ☐ a square represents polyester matrix resin
- ○ a circle represents calcium carbonate filler particle
- ∘∘∘ light beads represent reactive liquid polymer
- ○ solid band around the filler particle is a coupling agent adhering to the filler particle
- ◎ an open band around the filler particle is a reactive liquid polymer film adhering to the filler particle
- blend of coupling agent and reactive

TABLE III

| Content (phr): | A | B | C | D | E | F | G | H | I |
|---|---|---|---|---|---|---|---|---|---|
| Polyester Matrix Resin | 100 | 100 | 100 | 100 | 100 | 100 | 100 | 100 | 100 |
| Methyl Ethyl Ketone | 1 | 1 | 1 | 1 | 1 | 1 | 1 | 1 | 1 |
| Co. Naph. Accelerator | 0.25 | 0.25 | 0.25 | 0.25 | 0.25 | 0.25 | 0.25 | 0.25 | 0.25 |
| CaCO$_3$ Filler | — | 100 | 100 | 100 | 100 | 100 | 100 | 100 | 100 |
| Titanate Coupling Agent | — | — | — | — | 0.50 | 0.46 | — | — | — |
| HTE (X1) RLP | — | — | 15.50 | — | 15.50 | 6.78 | — | — | — |
| HTE (X2) RLP | — | — | — | — | — | — | 6.78 | — | — |
| VTBNX (X23) RLP | — | — | — | — | — | — | — | 8.55 | 27.7 |
| Vanax CPA Accelerator | — | — | — | — | 0.53 | 0.23 | 0.23 | — | — |
| Methyl Nicklate AO | — | — | — | — | 0.15 | 0.06 | 0.06 | — | — |
| Thiate-E Accelerator | — | — | — | — | — | — | — | — | — |
| Fracture Toughness (in-lb/in$^2$) | 0.197 | 0.331 | 0.275 | 0.268 | 0.179 | 0.390 | 0.373 | 0.928 | 1.102 |

Analysis of the data presented in Table III, above, indicates that pretreatment or overcoating the filler with a reactive liquid polymer provides significant improvement in fracture toughness. Sample A, which was a cured polyester matrix resin above, shows fracture toughness of 0.197 whereas addition of 100 parts filler per 100 parts of the matrix resin, i.e., sample B, increased this value to 0.331. In sample c, the matrix resin was blended with 15.50 parts of a lower molecular weight HTEX1 reactive liquid polymer before the blend of the two materials was mixed with the filler. Sample C showed a decreased fracture toughness of 0.275. Similar result was obtained for sample D where the filler was overcoated with a titanate coupling agent before blending with the matrix resin. Sample E showed unexpectedly poor fracture toughness which was even lower than the cured matrix resin of sample A. In sample E, the matrix resin, the reactive liquid polymer and the filler were blended together and then formed into a cured test sample. A significant improvement in fracture toughness was realized in the case of samples F, G, H and I. All of these samples were prepared by initially overcoating the filler with a reactive liquid polymer and then admixing the overcoated filler with a matrix resin before forming a cured composite test sample. Respective fracture toughness of samples F and G prepared with hydroxyl-terminated epichlorohydrin reactive liquid polymers are 0.390 and 0.373 whereas for samples H and I, prepared with a vinyl terminated reactive liquid polymer, the respective values are 0.928 and 1.102. The fracture toughness values for samples H and I are about triple those for sample B, prepared by mixing the filler with the matrix resin.

In Table IV, below, comparison data is provided for samples F and G versus samples J, K, L and M. Samples F and G were prepared by initially overcoating the filler with an HTE reactive liquid polymer and then mixing the overcoated filler with the matrix resin whereas samples J to M were prepared by overcoating the filler with a blend of an HTE reactive liquid polymer and a titanate coupling agent and then mixing the overcoated filler with the matrix resin.

TABLE IV

| Content (phr): | F | G | J | K | L | M |
|---|---|---|---|---|---|---|
| Polyester Matrix Resin | 100 | 100 | 100 | 100 | 100 | 100 |
| Methyl Ethyl Ketone | 1 | 1 | 1 | 1 | 1 | 1 |
| Co. Naph. Accelerator | 0.25 | 0.25 | 0.25 | 0.25 | 0.25 | 0.25 |
| CaCO$_3$ Filler | 100 | 100 | 100 | 100 | 100 | 100 |
| Titanate Coupling Agent | — | — | 0.56 | 0.46 | 0.49 | 0.46 |
| HTE (X1) RLP | 6.78 | — | 6.74 | 15.29 | — | — |
| HTE (X2) RLP | — | 6.78 | — | — | 7.79 | 15.29 |
| VTBNX (X23) RLP | — | — | — | — | — | — |
| Vanax CPA Accelerator | 0.23 | 0.23 | 0.23 | 0.53 | 0.20 | 0.53 |
| Methyl Nicklate AO | 0.06 | 0.06 | 0.06 | 0.15 | 0.06 | 0.15 |
| Thiate-E Accelerator | — | — | — | — | — | — |
| Fracture Toughness (in-lb/in$^2$) | 0.390 | 0.373 | 0.479 | 0.515 | 0.318 | 0.584 |

As is apparent from Table IV, above, fracture toughness values for samples F and G are nearly the same, 0.390 versus 0.373, indicating lack of significant difference between lower and higher molecular weight HTE reactive liquid polymers. There is a considerable variation in fracture toughness values for samples J to M. Addition of the coupling agent generally results in improved fracture toughness (note samples J, K and M), except with higher molecular weight HTEX2 reactive liquid polymer when used at low concentration (note sample L). Table IV, above, also demonstrates that higher fracture toughness values are obtained at higher concentration of the reactive liquid polymers.

The effect of accelerator Thiate-E for cross-linking of the reactive liquid polymers on fracture toughness is shown in Table V, below, where samples J, K, L and M are compared to samples N, O, P and Q. Samples J to Q were prepared by blending the titanate coupling agent with an HTE reactive liquid polymer, overcoating the filler with the blend of the coupling agent and the liquid polymer, and then mixing the overcoated filler with the matrix resin. The difference between samples J to M and N to Q was Thiate-E, the accelerator: samples J to M did not contain any whereas samples N to Q did. Wherever used, Thiate-E was hand mixed with the overcoated filler prior to addition of the matrix resin.

TABLE V

| Content (phr): | Sample No. J | K | L | M | N | O | P | Q |
|---|---|---|---|---|---|---|---|---|
| Polyester Matrix Resin | 100 | 100 | 100 | 100 | 100 | 100 | 100 | 100 |
| Methyl Ethyl Ketone | 1 | 1 | 1 | 1 | 1 | 1 | 1 | 1 |
| Co. Naph. Accelerator | 0.25 | 0.25 | 0.25 | 0.25 | 0.25 | 0.25 | 0.25 | 0.25 |
| $CaCO_3$ Filler | 100 | 100 | 100 | 100 | 100 | 100 | 100 | 100 |
| Titanate Coupling Agent | 0.56 | 0.46 | 0.49 | 0.46 | 0.56 | 0.46 | 0.49 | 0.46 |
| HTE (X1) RLP | 6.74 | 15.29 | — | — | 6.74 | 15.29 | — | — |
| HTE (X2) RLP | — | — | 7.79 | 15.29 | — | — | 7.79 | 15.29 |
| VTBNX (X23) RLP | — | — | — | — | — | — | — | — |
| Vanax CPA Accelerator | 0.23 | 0.53 | 0.20 | 0.53 | 0.23 | 0.53 | 0.20 | 0.53 |
| Methyl Nicklate AO | 0.06 | 0.15 | 0.06 | 0.15 | 0.06 | 0.15 | 0.06 | 0.15 |
| Thiate-E Accelerator | — | — | — | — | 0.027 | 0.063 | 0.013 | 0.031 |
| Fracture Toughness (in/lb/in²) | 0.479 | 0.515 | 0.381 | 0.584 | 0.426 | 0.710 | 0.502 | 0.603 |

Generally speaking, the use of Thiate-E accelerator for cross-linking the HTE reactive liquid polymers provides further improvement in fracture toughness except for lower molecular weight HTEX1 liquid polymer at low concentration. This is apparent from comparison of all the samples except samples J and N. Sample J, prepared with lower molecular weight HTEX1 liquid polymer at low concentration and without the accelerator, had fracture toughness of 0.479 whereas Sample N, prepared with the same HTEX1 liquid polymer with the accelerator, had fracture toughness of 0.426. As can be verified from Table V, samples J to Q indicate that higher fracture toughness is obtained at higher concentrations of the reactive liquid polymers.

I claim:

1. Composition of matter devoid of an ethylenically unsaturated acid or anhydride containing essential components consisting essentially of filler particles, a functionally-terminated elastomeric reactive liquid polymer as a thin film disposed on each of said filler particles, and a polymeric matrix in which said coated filler particles are embedded, said liquid polymer having Tg in the range of about 20° to −200° C. and number average molecular weight in the range of about 1,000 to 20,000.

2. Composition of claim 1 wherein said filler is selected from inorganic fillers; said liquid polymer is selected from hydroxyl, vinyl, amine, carboxyl, mercaptan, isocyanate, and epoxy terminated reactive liquid polymers and mixtures thereof; and said polymeric matrix is selected from the thermosetting, thermoplastic, and mixtures of such resins.

3. Composition of claim 2 wherein amount of said reactive liquid polymer can vary from 0.1 to 50 parts by weight per 100 parts by weight of said filler and amount of said coated filler can vary up to 500 parts per 100 parts of said matrix material.

4. Composition of claim 2 wherein amount of said reactive liquid polymer can vary from 2.5 to 20 parts per 100 parts of said filler and amount of said coated filler can vary from 20 to 200 parts per 100 parts of said matrix material.

5. Composition of claim 4 wherein said reactive liquid polymer is selected from vinyl, amine, and carboxyl terminated reactive liquid polymers, and mixtures thereof.

6. Composition of claim 5 wherein said liquid polymer contains polymerized units selected from monoolefins containing 2 to 8 carbon atoms, dienes containing 4 to 10 carbon atoms, vinyl aromatics containing 8 to 12 carbon atoms, vinyl nitriles containing 3 to 6 carbon atoms, vinyl and allyl esters containing 4 to 8 carbon atoms, vinyl and allyl ethers containing 3 to 8 carbon atoms, aromatic divinyls containing 8 to 12 carbon atoms, aliphatic divinyls containing 4 to 8 carbon atoms, diacrylates containing 8 to 12 carbon atoms, acrylic acids containing 3 to 6 carbon atoms, esters or acrylic and methacrylic acids containing a total of 4 to 23 carbon atoms, and mixtures thereof; said polymeric matrix is an unsaturated polyester resin.

7. Composition of claim 6 wherein said liquid polymer contains polymerized units selected from ethylene, butadiene, isoprene, butadiene-acrylonitrile, butadiene-styrene, butadiene-acrylonitrile-acrylic acid, ethyl acrylate, ethyl acrylate-butyl acrylate, butyl-acrylate-acrylonitrile, and butyl-acrylate-styrene; Tg of said liquid polymer is in the range of about −20° C. to −80° C.; and number average molecular weight of said liquid polymer is in the range of about 2,000 to 5,000.

8. Composition of claim 4 including an effective amount of a coupling agent to bond said filler particles to said reactive liquid polymer, said coupling agent is selected from the group consisting essentially of silane and titanate coupling agents, and said filler is calcium carbonate.

9. Composition of claim 8 wherein amount of said coupling agent is 0.01 to 10 parts per 100 parts of said filler, and wherein amount of said liquid polymer on said filler particles being sufficient to provide a film of about 500 to 2,000 angstroms in thickness.

10. Composition of claim 6 including a coupling agent adhering to said filler particles and bonding said reactive liquid polymer to said filler particles, said coupling agent is selected from the group consisting essentially of silanes, titanates and mixtures thereof and amount thereof being 0.1 to 5 parts per 100 parts of said filler, the composition further including an effective amount of a low temperature cross-linking agent for said polymeric matrix.

11. Method of producing a composite devoid of an ethylenically unsaturated acid or anhydride comprising filler particles coated with a functionally terminated elastomeric reactive liquid polymer embedded in a polymeric matrix, said method comprising mixing said reactive liquid polymer and said filler in order to provide a thin film of said reactive liquid polymer on said filler particles, mixing said coated filler particles with a polymeric matrix, and forming said composite, said liquid polymer having Tg in the range of about 20° to −100° C. and number average molecular weight in the range of about 1,000 to 20,000.

12. Method of claim 11 wherein said filler is selected from inorganic fillers; said reactive liquid polymer is selected from hydroxyl, vinyl, amine, carboxyl, mercaptan, isocyanate, and epoxy terminated reactive liquid polymers and mixtures thereof; and said polymeric matrix is selected from thermosetting resins, thermoplastic resins, and mixtures of these materials.

13. Method of claim 12 wherein amount of said reactive liquid polymer can vary from 2.5 to 20 parts per 100 parts of said filler and amount of said coated filler can vary from 20 to 200 parts per 100 parts of said matrix material.

14. Method of claim 13 wherein said liquid polymer is selected from vinyl, amine, and carboxyl terminated reactive liquid polymers, and mixtures thereof; and said matrix is an unsaturated polyester resin.

15. Method of claim 13 wherein said liquid polymer is selected from hydroxyl terminated reactive epichlorohydrin liquid polymers, vinyl terminated butadiene-acrylonitrile reactive liquid polymers, and mixtures of such polymers; and said matrix resin is selected from polyester reins.

16. Method of claim 15 wherein said liquid polymer on said filler particles is calculated to provide a film of about 500 to 2000 angstroms in thickness.

17. Method of claim 16 including the steps of coating said filler with an effective amount of a coupling agent to bond said filler particles to said reactive liquid polymer, said coupling agent is selected from the group consisting essentially of silanes, titanates, and mixtures thereof.

18. Method of claim 17 wherein said coupling agent is selected from the group consisting essentially of silane and titanate coupling agents and is used in an amount of 0.01 to 10 parts per 100 parts of said filler.

19. Method of claim 17 including the step of admixing an effective amount of an accelerator for crosslinking said reactive liquid polymer, said accelerator being mixed with said coated filler particles before mixing thereof with said polymeric matrix, said filler being calcium carbonate.

* * * * *

UNITED STATES PATENT AND TRADEMARK OFFICE
CERTIFICATE OF CORRECTION

PATENT NO. : 4,478,963
DATED : October 23, 1984
INVENTOR(S) : Frederick J. McGarry It is certified that error appears in the above-identified patent and that said Letters Patent are hereby corrected as shown below:

Claim 1, line 41 "-200°C" should read -- -100°C--;

Claim 6, line 26 "or" should read --of--.

Signed and Sealed this

Twenty-sixth Day of November 1985

[SEAL]

Attest:

Attesting Officer

DONALD J. QUIGG

Commissioner of Patents and Trademarks